United States Patent
Mebarkia et al.

(10) Patent No.: US 9,602,045 B2
(45) Date of Patent: Mar. 21, 2017

(54) SYSTEM, APPARATUS, AND METHOD FOR MONITORING A SUBSEA FLOW DEVICE

(71) Applicants: Sid A. Mebarkia, Sugar Land, TX (US); Antonio C. F. Critsinelis, Kingwood, TX (US); Steven E. Wooldridge, Houston, TX (US)

(72) Inventors: Sid A. Mebarkia, Sugar Land, TX (US); Antonio C. F. Critsinelis, Kingwood, TX (US); Steven E. Wooldridge, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 14/496,609

(22) Filed: Sep. 25, 2014

(65) Prior Publication Data

US 2015/0159481 A1 Jun. 11, 2015

Related U.S. Application Data

(63) Continuation-in-part of application No. 12/829,289, filed on Jul. 1, 2010, now Pat. No. 9,004,174.

(51) Int. Cl.
*H01L 35/32* (2006.01)
*B23P 11/00* (2006.01)
(Continued)

(52) U.S. Cl.
CPC .......... *H02S 10/20* (2014.12); *E21B 41/0085* (2013.01); *E21B 43/01* (2013.01); *E21B 47/14* (2013.01); *F17D 5/06* (2013.01)

(58) Field of Classification Search
None
See application file for complete search history.

(56) References Cited

U.S. PATENT DOCUMENTS 3,691,408 A 9/1972 Rosso
4,365,306 A 12/1982 House et al.
(Continued)

FOREIGN PATENT DOCUMENTS

| GB | 2320733 B | 12/1998 |
|---|---|---|
| GB | 2409473 A | 6/2005 |
| WO | 03067029 | 8/2003 |

OTHER PUBLICATIONS

M. Karayaka et al, Tahiti Online Monitoring System for Steel Catenary Risers and Flowlines, May 4-7, 2009, Offshore Technology Conference, Houston, TX.
(Continued)

*Primary Examiner* — Matthew R Buck
*Assistant Examiner* — Douglas S Wood
(74) *Attorney, Agent, or Firm* — Karen R. DiDomenicis; Melissa Patangia; Nicholas Gallo

(57) ABSTRACT

A system, apparatus, and method are provided for monitoring a subsea flow device such as a subsea flowline. The apparatus generally includes a thermoelectric device that is adapted to generate electric power from a thermal potential between the subsea flow device and the surrounding seawater. A sensor that is powered by the thermoelectric device is adapted to monitor one or more characteristics of the flow device, such as temperature or strain, and provide a communication that is indicative of the characteristic. The communication may be a radiation output or an acoustic output.

7 Claims, 9 Drawing Sheets

(51) Int. Cl.
| | |
|---|---|
| *G08C 19/22* | (2006.01) |
| *F03B 13/10* | (2006.01) |
| *F03B 13/00* | (2006.01) |
| *E21B 7/12* | (2006.01) |
| *E21B 41/00* | (2006.01) |
| *E21B 43/01* | (2006.01) |
| *H02S 10/20* | (2014.01) |
| *E21B 47/14* | (2006.01) |
| *F17D 5/06* | (2006.01) |

(56) References Cited

U.S. PATENT DOCUMENTS

| | | | |
|---|---|---|---|
| 6,150,601 A | | 11/2000 | Schnatzmeyer |
| 6,965,320 B1* | | 11/2005 | Casey ............... F16L 55/48 324/71.2 |
| 7,395,864 B2* | | 7/2008 | Ramachandran ........ C09K 8/52 137/13 |
| 7,657,468 B1 | | 2/2010 | Whiteley et al. |
| 8,660,595 B2* | | 2/2014 | Jensen ................. E21B 17/003 340/854.4 |
| 9,004,174 B2* | | 4/2015 | Mebarkia et al. ............ 166/336 |
| 2004/0124994 A1 | | 7/2004 | Oppelt |
| 2004/0168811 A1 | | 9/2004 | Shaw et al. |
| 2005/0024231 A1 | | 2/2005 | Fincher et al. |
| 2005/0207279 A1 | | 9/2005 | Chemali et al. |
| 2007/0035736 A1 | | 2/2007 | Vannuffelen et al. |
| 2007/0119243 A1 | | 5/2007 | Smits et al. |
| 2008/0163692 A1 | | 7/2008 | Huang et al. |
| 2012/0094701 A1 | | 4/2012 | Jensen et al. |
| 2013/0014797 A1* | | 1/2013 | Ellson ................. E21B 41/0007 136/205 |
| 2014/0096808 A1* | | 4/2014 | Moczygemba ......... H01L 35/34 136/205 |
| 2015/0346064 A1* | | 12/2015 | Liu ........................ E21B 17/01 702/188 |

OTHER PUBLICATIONS

SINTEF Materials and Chemistry, SmartPipe, also located at http://www.sintef.no/Projectweb/SmartPipe/.

SINTEF Materials and Chemistry, SmartPipe Objectives, also located at http://www.sintef.no/Projectweb/SmartPipe/Objectives/.

SINTEF Materials and Chemistry, SmartPipe Benefits, also located at http://www.sintef.no/Projectweb/SmartPipe/Benefits/.

SINTEF Materials and Chemistry, SmartPipe development project, also located at http://www.sintef.no/Projectweb/SmartPipe/The-SmartPipe-development-project/.

SINTEF Materials and Chemistry, SmartPipe Continuous condition monitoring of pipelines and risers, also located at hhttp://www.sintef.no/project/Smart_pipeline/dokumenter/SmartPipe%20I%20General%20presentation%20090916.pdf.

* cited by examiner

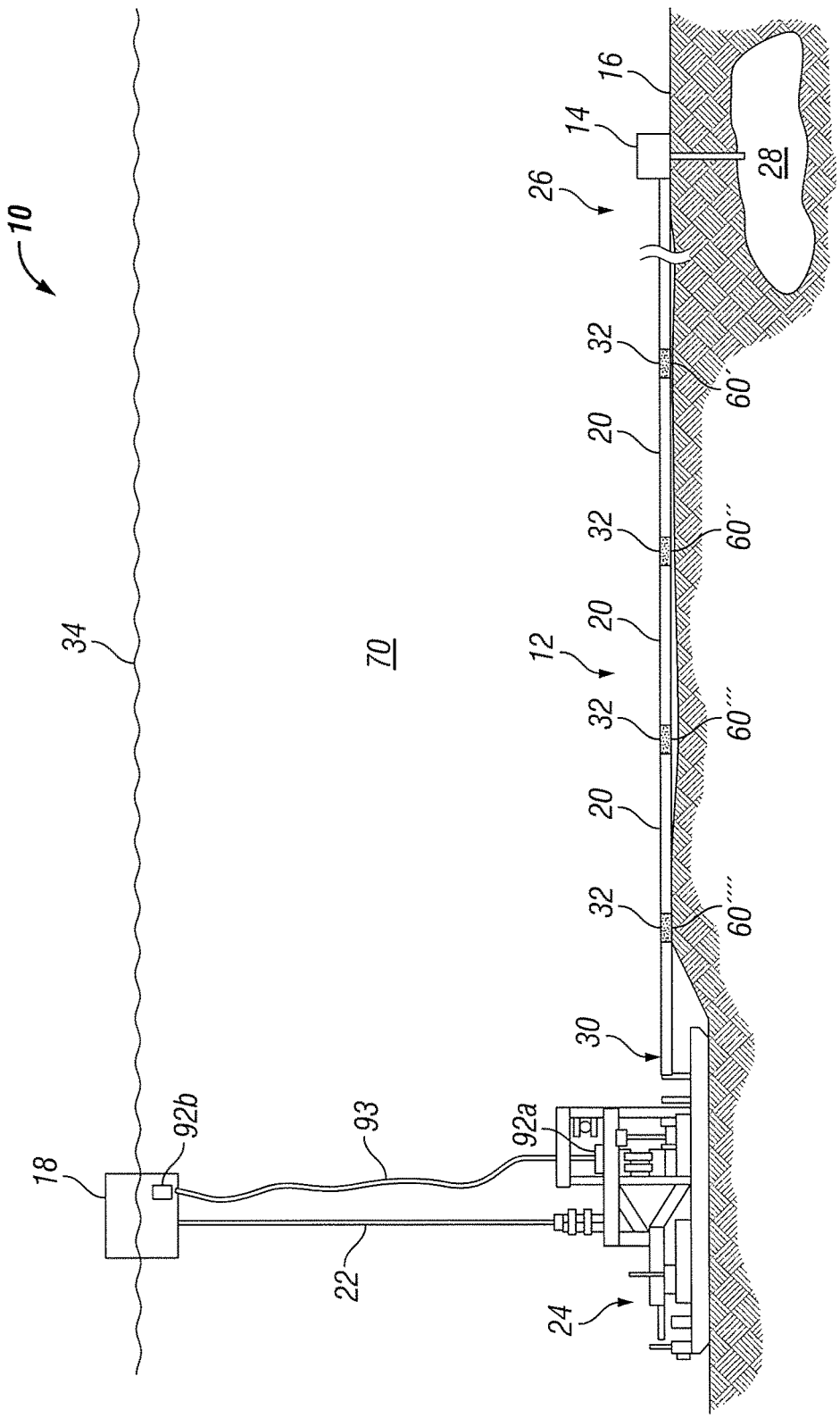

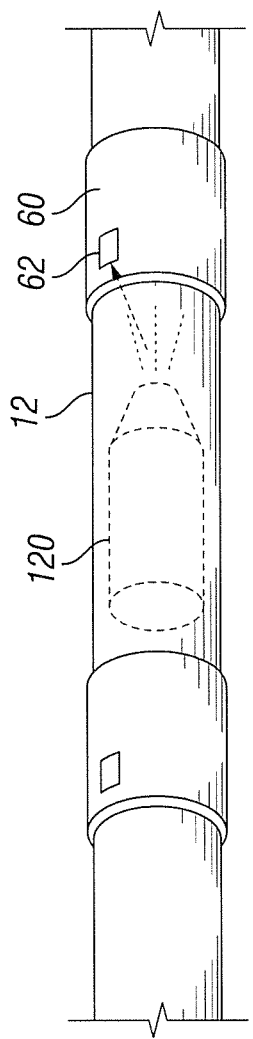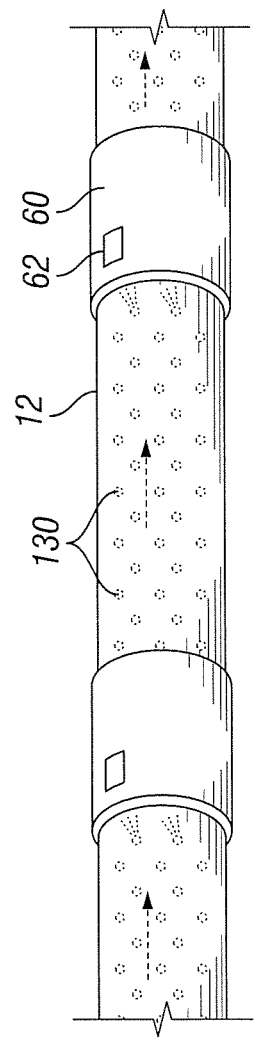

SYSTEM, APPARATUS, AND METHOD FOR MONITORING A SUBSEA FLOW DEVICE

CROSS-REFERENCE TO RELATED APPLICATIONS

The present application for patent is a continuation-in-part of U.S. non-provisional application bearing Ser. No. 12/829,289, filed on Jul. 1, 2010, which is incorporated herein by reference in its entirety.

BACKGROUND OF THE INVENTION

1. Field of the Invention

This invention relates to the monitoring of a subsea flow device, such as the monitoring of the temperature of a subsea flow line used in the production of fluids from a hydrocarbon reservoir, and the powering of such a monitoring operation.

2. Description of Related Art

In the production of fluids from a subsea hydrocarbon reservoir, a variety of subsea flow devices are typically used, such as a pipeline or flowline that is disposed on the seafloor and provides a passage through which the fluids be communicated. For example, a subsea well can provide produced fluids from the subsea reservoir to a subsea flowline that carries the fluids away from the well. The flowline can carry the fluids to an on-shore facility, other subsea equipment, a riser that carries the fluid to a topside facility, or the like. Other subsea flow devices can include flow storage, actuation, or control equipment, such as tanks, pumps, motors, valves, and the like.

The monitoring of such subsea flow devices can be important to achieving successful and optimal production from the well. For example, subsea flowlines that carry high temperature fluids can be exposed to severe temperature gradients and variations, especially for flowlines that operate in deep water. Even for insulated flowlines, high thermal gradients can result between the inside and outside of the flowline by virtue of the difference in temperature of the produced fluids inside the flowline and the seawater outside the flowline. Temperature variations over time can result from changes in the flow of the produced fluid, such as between times of production when the presence of the produced fluid can heat the pipe, and times of no production when the pipe is either empty of produced fluid or contains produced fluid that cools when it does not flow. The thermal effects on the pipeline can include stress, strain, and movement of the pipeline on the seafloor. In some cases, such effects can threaten the integrity of the flowline.

A subsea flowline can be monitored in an effort to assess the ongoing integrity of the flowline and thereby facilitate planned preventative measures and avoid unplanned interventions for unforeseen events, such as unplanned interruption of production. One conventional monitoring method includes performing periodic visual inspections of the flowlines using a Remotely Operated Vehicle (ROV) that can travel along the flowline and gather information with a camera. Alternatively, an in-place monitoring system can be installed on the flowline. The system can include multiple transducers that detect thermal or other data from a plurality of locations along the flowline, and the transducers can communicate the data via a fiber optic cable that extends along the flowline to a receiver. In some cases, the transducers can be powered by the thermal differential that exists between the flowline and the surrounding seawater. While the monitoring system could potentially provide more information than a visual inspection, such systems can be complex, expensive, and unreliable, e.g., because the fiber optic cable can break. Further, the installation of the system can be incompatible with some types of flowlines and certain flowline deployment techniques, and can increase the cost of providing, deploying, and maintaining the flowline.

A continued need exists for an improved system, apparatus, and method for monitoring a subsea flow device, such for monitoring the temperature or other characteristics along a flowline that is disposed on the seafloor and carries hot produced fluid in an environment of cold sea water. The system, apparatus, and method should be compatible with different types of deployment and provide reliable monitoring of the flow device.

SUMMARY OF THE INVENTION

The embodiments of the present invention generally provide a system, apparatus, and method for monitoring a subsea flow device, such as a subsea flowline that carries produced fluids from a subsea well. The apparatus generally includes a thermoelectric device and a sensor. The thermoelectric device is adapted to generate electric power from a thermal potential between the subsea flow device and surrounding seawater. For example, the subsea flow device can be a subsea flowline that is formed of a plurality of successive pipe segments joined at joints, and the thermoelectric device can be mounted to the flowline at one of the joints or at other location(s) along the flowline. The apparatus can be attached to the flowline during assembly and deployment of the flowline or the apparatus can be attached to an existing flowline. With the flowline in operation, a temperature differential can exist across the thermoelectric device by virtue of the temperature difference between the relatively hot produced fluids in the flowline and the relatively cold seawater surrounding the flowline.

The sensor is powered by the thermoelectric device and adapted to monitor a characteristic of the flow device. In addition, the sensor may be equipped with a device to communicate the monitored characteristic. For example, the sensor may be equipped with a device to provide a radiation output that is indicative of the monitored characteristic. For example, the sensor can be configured to monitor the temperature of and/or the strain in the flowline and communicate a signal that is indicative of the temperature and/or strain by varying the radiation output to indicate the characteristic(s) monitored by the sensor, such as by providing a varying light output or light-emitting diode (LED). The light output can be provided on the flowline, i.e., at the location of the flowline so that it can be observed subsea along with the flowline.

To provide communication, the apparatus may also be equipped with a device separate from the sensor to communicate the monitored characteristic. For example, the apparatus may be equipped with an acoustic device to provide an acoustic output that is indicative of the characteristic. The acoustic device could be both wireless and provide real-time information of the monitored characteristic. The apparatus may also be equipped with radio frequency (RF) or electromagnetic (EM) devices to provide communication.

To provide communication, the apparatus may also be equipped with more than one communication methods as back-up methods. For example, when utilizing the light output communication method a back-up not dependent on line of sight might be used.

The apparatus can also include a solar cell and/or a battery. The solar cell can be configured to receive sunlight to charge the battery before deployment of the apparatus, receive light from an underwater source after deployment of the apparatus, and power the sensor to monitor the characteristic of the flow device.

In some cases, the apparatus includes a memory that is collocated with the thermoelectric device and the sensor. The memory can be adapted to store information from the sensor that is indicative of the measured characteristic over a period of time and output the information for the period of time.

One system of the present invention for monitoring a subsea flow device includes a plurality of the apparatuses. Each of the apparatuses can be disposed respectively at successive joints along the length of the flowline. In some cases, each apparatus located at a respective joint can also be configured to communicate signals indicative of the characteristic at a plurality of joints to a successive one of the apparatuses located at a joint successive to the respective joint.

According to another embodiment, the present invention provides a method for monitoring a subsea flow device. The method includes generating electric power from a thermal potential between the subsea flow device and surrounding seawater, using the electric power to operate a sensor and thereby monitoring a characteristic of the flow device, and providing communication such as a radiation output or acoustics that is indicative of the characteristic monitored by the sensor.

The method can include using a solar cell to receive light from an underwater source and thereby provide light-derived power, and powering the sensor with the light-derived power. In some cases, a solar cell is used to receive sunlight before the flow device is deployed to a subsea location and thereby provide sunlight—derived power. For example, the solar cell can receive light before and immediately after entering the water, and the solar cell can convert the light to electricity to power the sensor, thereby allowing the sensor to monitor the flowline during the installation of the flowline. A battery is charged with the sunlight-derived power, and the sensor is powered with the battery when the thermal potential is not sufficient for powering the sensor. Subsequent to the powering of the sensor with the battery, the solar cell can also be used to receive light from an underwater source and thereby provide light-derived power, which can be used to power the sensor. For example, the underwater source can be provided by an underwater vehicle, which can also detect the radiation output from the sensor to thereby determine the characteristic monitored by the sensor. Further, the underwater vehicle can also receive communication from the acoustic device. An underwater vehicle can include both a Remotely Operating Vehicle (ROV) or an Autonomous Underwater Vehicle (AUV).

The method can also include mounting an apparatus to the subsea flow device, the apparatus being configured to perform the operations of generating the electric power, using the electric power, and providing the communication such as radiation output or acoustics. More particularly, the subsea flow device can be a subsea flowline that has a plurality of successive pipe segments that are joined at joints, and the thermoelectric device can be mounted to the pipe at one of the joints. The communication can be radiation output associated with the sensors provided by varying a light output on the flowline to thereby indicate the characteristic of the flowline, e.g., a temperature and/or a strain of the flowline. In the alternative, the communication can be a device providing an acoustic output to thereby indicate the characteristic of the flowline. The operations of generating the electric power, using the electric power, and providing the communication can be performed at a plurality of locations at successive positions along the length of the flowline.

Once an apparatus is mounted on the subsea flow device, in one embodiment of the method an underwater vehicle can be passed along the flowline to successively receive the communication and thereby determine the characteristic monitored by each of the sensors. In another embodiment of the method, a pipeline internal moving device (such as a pig, a smart pig, inline inspection tools, or other devices) can be equipped with receivers to receive the communication during the pigging operation of the flowline. In another embodiment of the method, a group of sensors in a stream flow can be launched through one end of a pipeline to receive and collect data from the apparatus mounted on the subsea flow device.

Information from the sensor of each apparatus can be stored in a memory mounted on the subsea flow device. The information can be indicative of the characteristic over a period of time, and the information can be output for the period of time from the memory. In some cases, a signal that is indicative of the temperature and/or strain of the flow device can be communicated from the sensor to a distal receiver. The operations of generating electric power, using the power, and providing the acoustic or radiation output can include generating electric power at a plurality of locations along the subsea flow device, using the electric power to operate a sensor at each location, and providing an acoustic or radiation output at each location that is indicative of the characteristic monitored by the sensor at the location. Signals indicative of the characteristic monitored by a plurality of the sensors can be communicated from each sensor to a successive one of the sensors at a successive one of the locations such that the signals are communicated step-wise along the subsea flow device. For example, each sensor can be configured to communicate wirelessly and directly with at least two successive sensors along the subsea flow device.

The system, apparatus, and method of the present invention can be implemented during the installation of a new flow device or during the retrofitting of an existing flow device.

The system, apparatus, and method of the present invention can generally provide monitoring of the flow device, information which can be useful in understanding and maintaining the integrity of the flow device and assisting in keeping the flow device in operation. In some cases, each monitoring apparatus can be relatively simple, small, and inexpensive compared to conventional, more complex systems.

BRIEF DESCRIPTION OF THE DRAWINGS

Figure 2A:
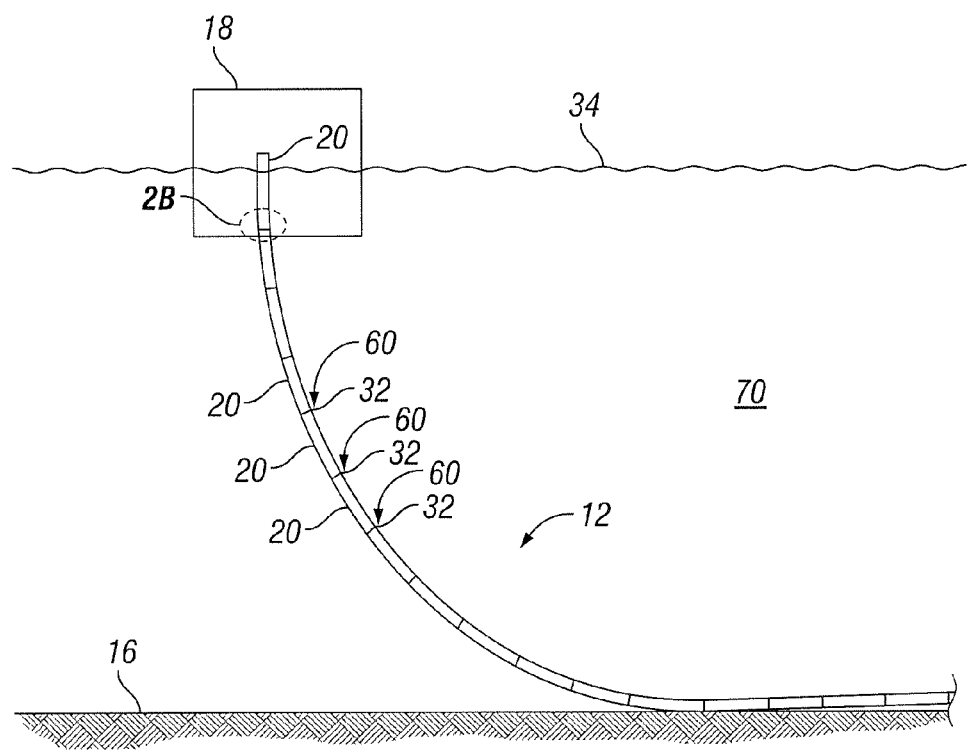
Figure 2B:
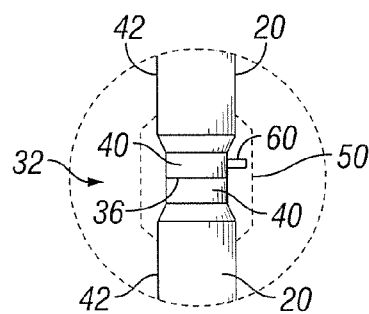
Figure 3:
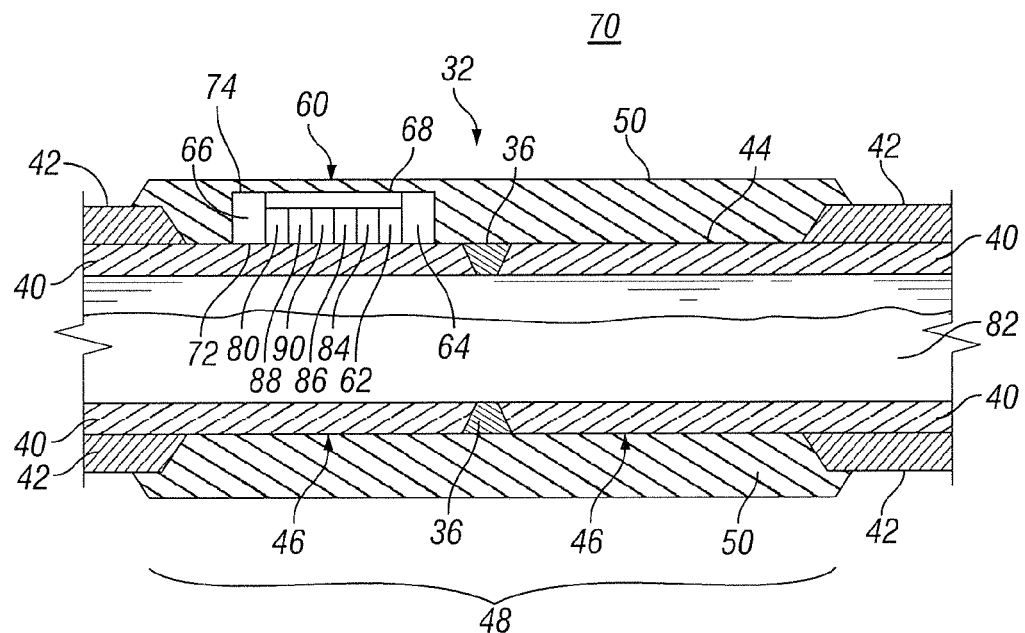
Figure 4:
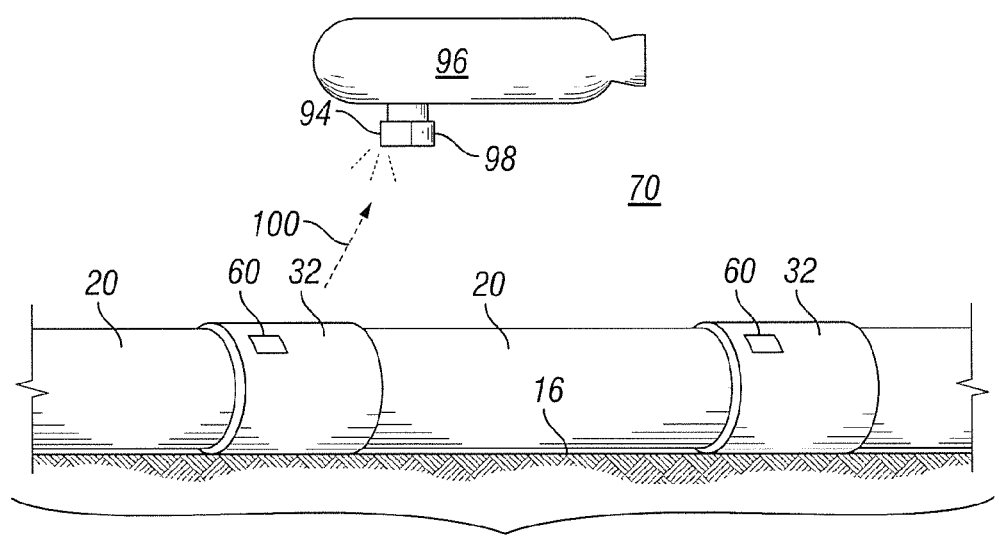
Figure 5:
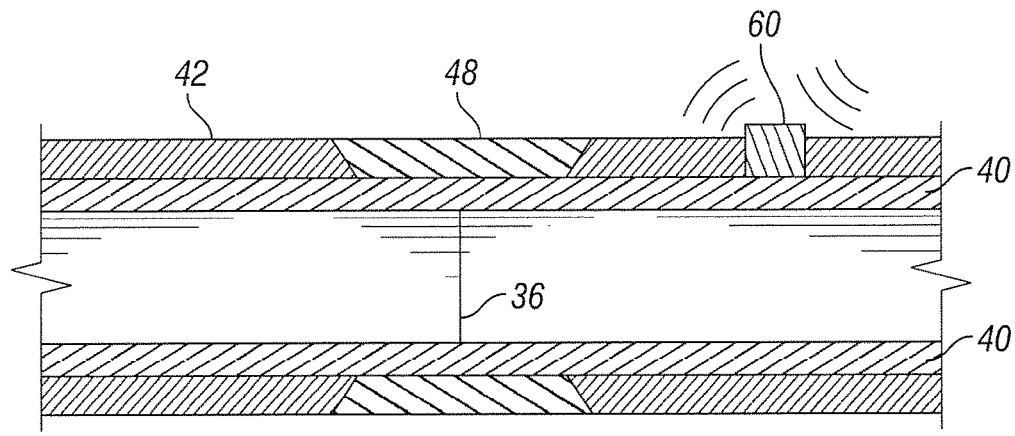
Figure 6:
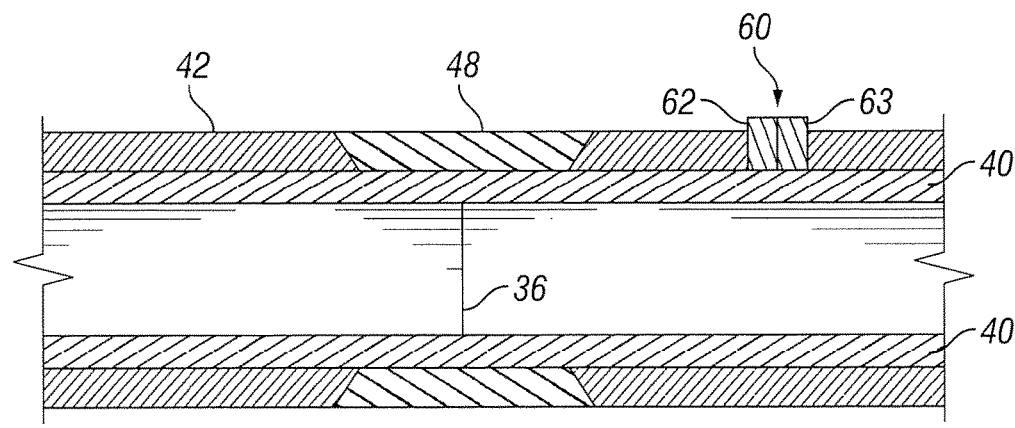
Figure 7A:
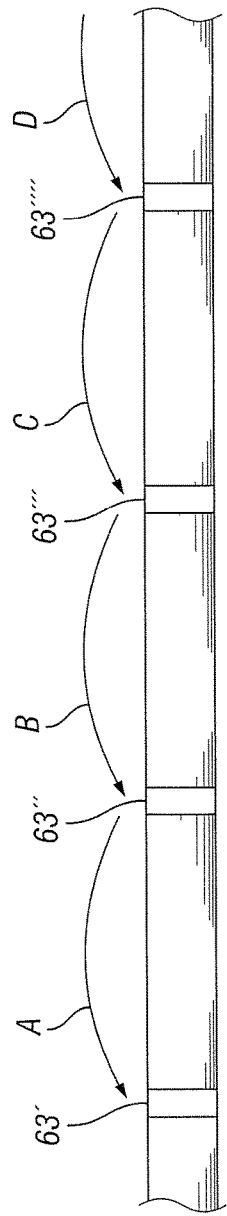
Figure 7B:
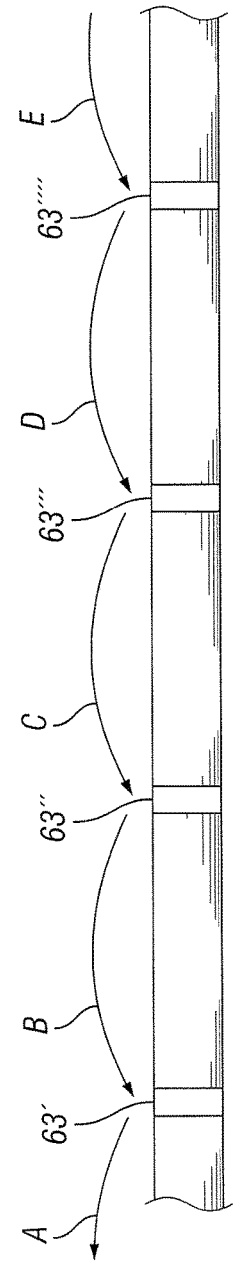
Figure 7C:
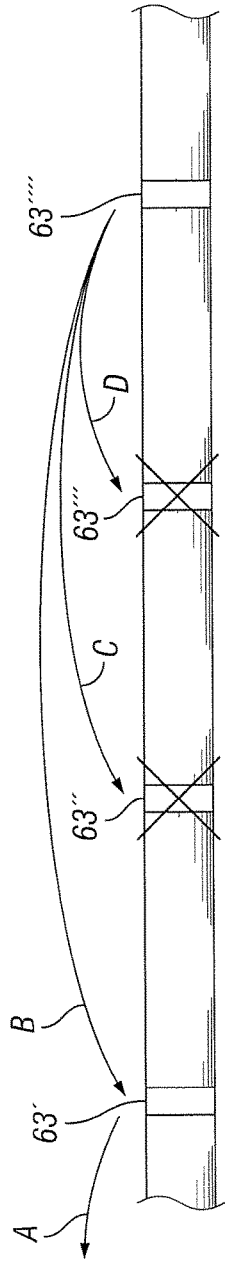
Figure 8:
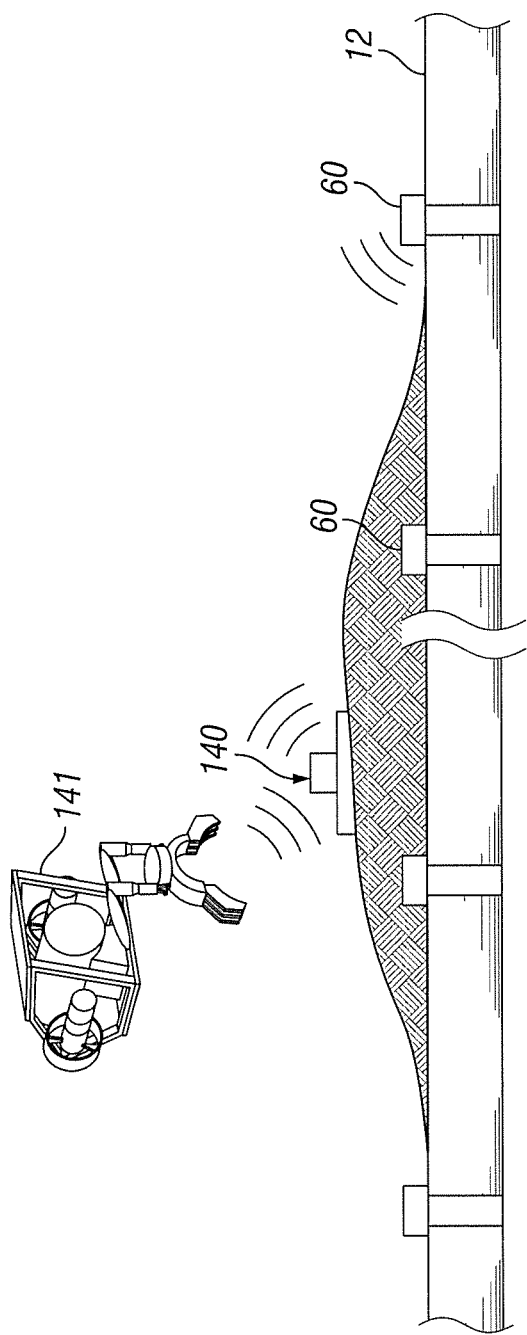
Figure 9A:
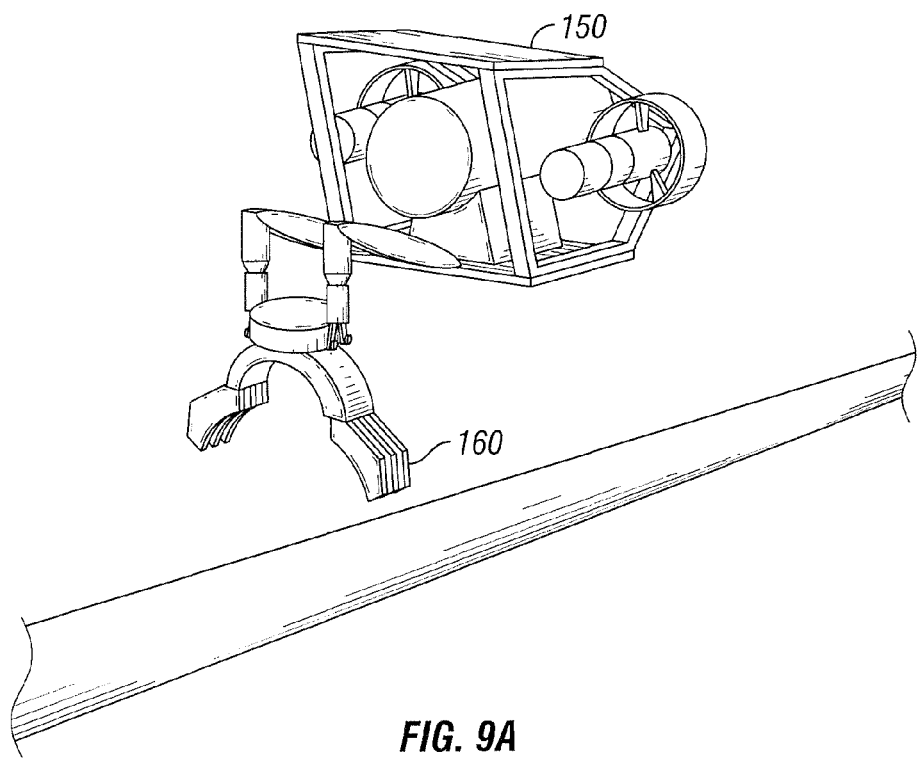
Figure 9B:
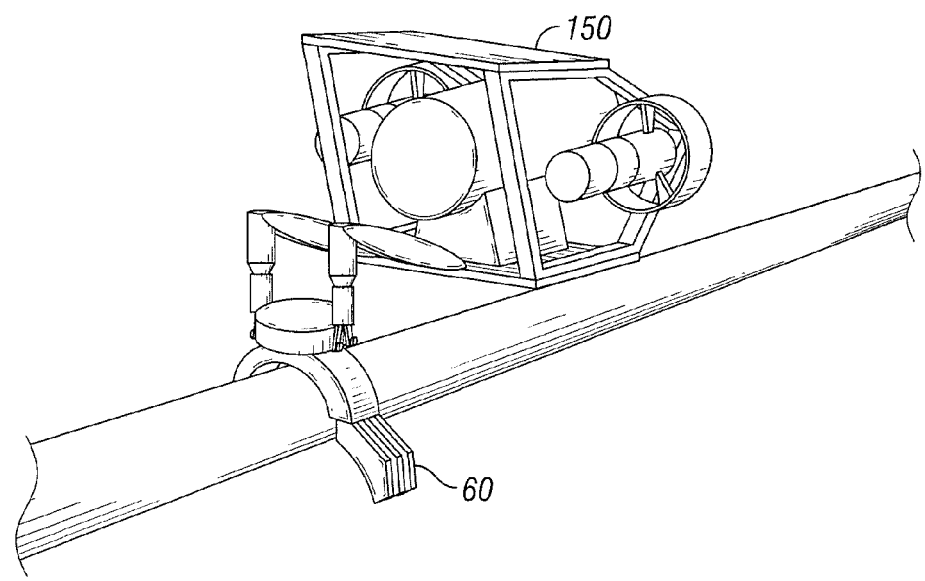
Figure 10:
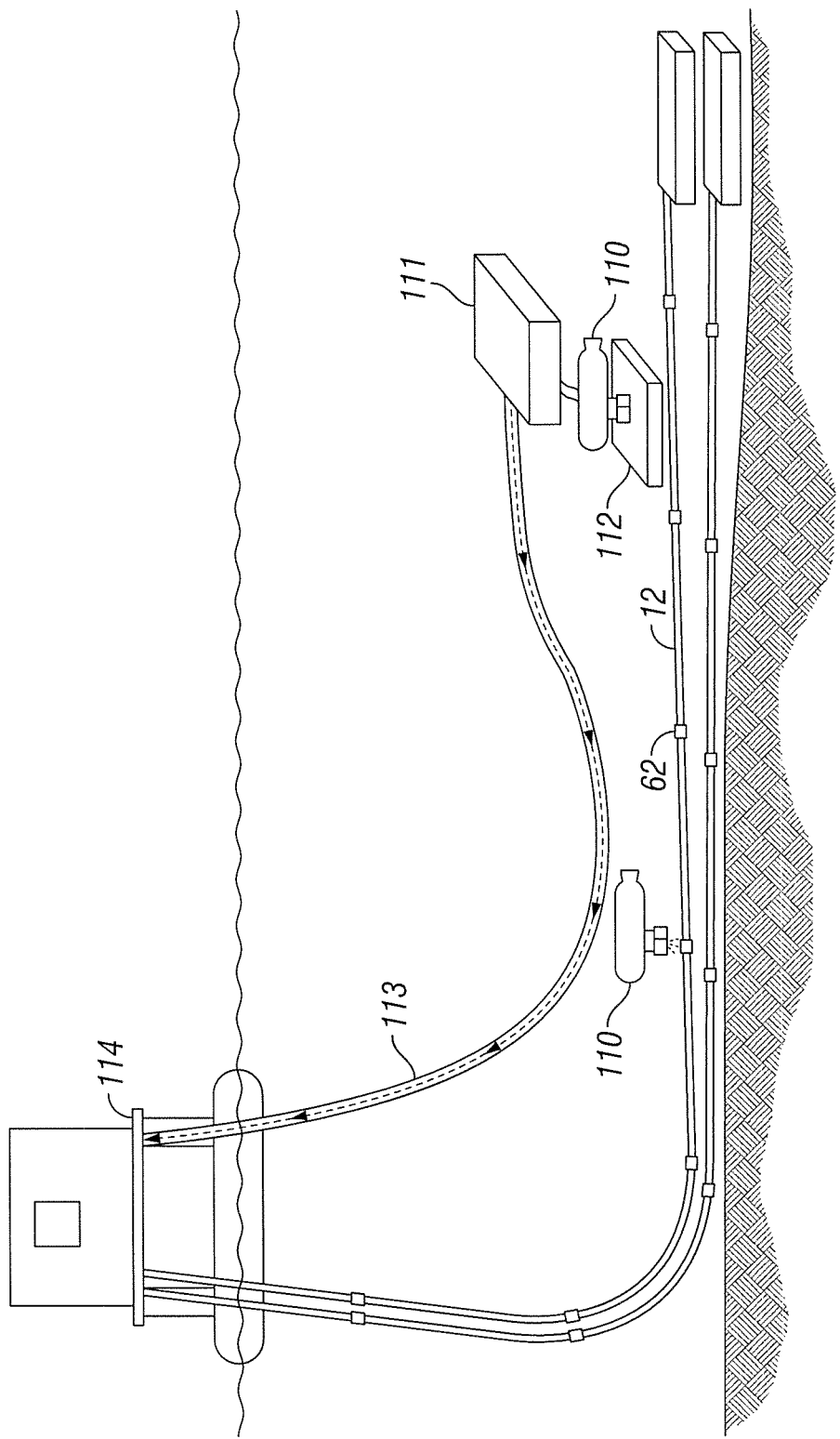

Having thus described the invention in general terms, reference will now be made to the accompanying drawings, which are not necessarily drawn to scale, and wherein:

FIG. 1 is a schematic view illustrating a system for monitoring a subsea flow device according to one embodiment of the present invention;

FIG. 2A is a schematic view illustrating the system of FIG. 1 during assembly and deployment;

FIG. 2B is an enlarged view illustrating a joint between two adjacent pipe segments of the system of FIG. 2A;

FIG. 3 is a section view schematically illustrating one monitoring apparatus and a joint of the flowline of the system of FIG. 1;

FIG. 4 is a schematic view illustrating a portion of the system of FIG. 1, shown with an underwater vehicle collecting information from the system;

FIG. 5 is a section view schematically illustrating one monitoring apparatus provided at any location along the flowline of the system;

FIG. 6 is a section view schematically illustrating one monitoring apparatus with an acoustic device for communication;

FIGS. 7A, 7B, and 7C depict different methods for data transmission for the acoustic communication embodiment;

FIG. 8 depicts a repeater placed near a buried flowline in order to transmit data for one embodiment of the acoustic communication method;

FIGS. 9A and 9B are schematic views illustrating an underwater vehicle installing the apparatus on an existing flowline;

FIG. 10 is a schematic view illustrating a portion of the system of FIG. 1, shown with a resident AUV collecting information from the system;

FIG. 11 is a schematic view illustrating a portion of the system of FIG. 1, shown with a pipeline internal moving device receiving information from the system; and FIG. 12 is a schematic view illustrating a plurality of sensors in a stream in the flowline.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Referring now to the drawings and, in particular, to FIG. 1, there is shown a system 10 for monitoring a subsea flow device according to one embodiment of the present invention. Generally, the system 10 can be used to monitor a subsea flowline 12, a pipeline that is configured to receive produced fluid from a subsea well 14 and deliver the fluids along the seabed 16, upward to a floating surface facility 18, to a land facility, or otherwise. It is appreciated that the system 10 can include and can monitor other types of flow devices such as valves, spools, pumps, motors, and other subsea equipment.

In the illustrated embodiment, the subsea flowline 12 is made of a plurality of successive pipe segments 20 that are joined to form a desired length. The topside facility 18 can be a structure that is rigidly fixed to the seabed 16, a floating structure, or a moored structure. For example, in some cases, topside facility 18 can be a ship with special equipment for assembling and deploying the flowline 12. The flowline 12 can extend to the topside facility 18, or the flowline 12 can be connected to the topside facility 18 by a riser 22 or other tubular member.

FIG. 1 illustrates the flowline 12 in a typical deployed configuration, extending from one or more subsea wells 14 to a pipeline end terminal ("PLET") 24. At a first end 26, the flowline 12 is configured to receive produced fluid from the well 14 and a reservoir 28 under the seabed 16, and additional equipment such as pumps, can be provided facilitating the transportation and handling of the fluid. At the opposite, second end 30, the flowline 12 can be connected by the PLET 24 to the riser 22 that delivers the produced fluid to a topside facility 18, which can be the same or a different structure than the facility 18 that was previously used to deploy the flowline 12. The PLET 24 can be configured to accommodate movement of the end 30 of the flowline 12, e.g., to allow the flowline 12 to extend or contract as it heats or cools.

FIG. 2A illustrates the assembly and deployment of the flowline 12, which, in the illustrated embodiment, is formed of a plurality of the pipe segments 20 and defines joints 32 between adjacent segments 20. Before deployment of the flowline 12, the pipe segments 20 can be provided to the topside facility 18 in uniform lengths that are sufficiently short to facilitate transport and handling, such as lengths of about 40 feet or less that can be delivered by truck and otherwise handled using conventional equipment. The pipe segments 20 are typically joined as part of the deployment operation, using assembly equipment that can be provided at the topside location. For example, the topside facility 18 can be, or can include, a ship or other facility with equipment for handling and assembling the pipe segments 20. The segments 20 can be assembled and lowered according to various conventional methods, typically by joining successive segments 20 to form a long flowline 12 that is successively lowered below the water surface 34 and deployed on the seabed 16.

The connections or "field joints" 32 of successive pipe segments 20 typically included welded connections 36, which are formed by welding the segments 20 together during deployment. If the pipe segments 20 are multi-layer tubular members that include thermal insulation, the insulation typically does not extend to the ends of the segments 20. For example, as shown in FIGS. 2A and 3, the pipe segments 20 can include steel pipe 40 with insulation 42 on the outside surface 44 thereof. The insulation 42 on each segment 20 can leave an end portion 46 of the steel pipe 40 exposed before assembly of the segments 20. Thus, each segment 20 can have a small end portion 46 at each end where the steel pipe 40 is exposed to facilitate the welding of the successive segments 20. After welding two successive segments 20, the gap or "field joint area" 48 between the insulation 42 of the two segments 20 can be filled with a fluid field joint fill material 50, such as injection-molded polypropylene, that cures or dries before or after the joint 32 is lowered into the water and to the seabed 16.

The monitoring system 10 as illustrated in FIGS. 1 and 2A includes a plurality of monitoring apparatuses (individually indicated in FIG. 2A by reference numerals 60', 60'', 60''', 60'''' and referred to collectively by reference numeral 60), which are disposed at successive joints 32 along the length of the flowline 12. More particularly, at least one monitoring apparatus 60 can be disposed at each joint 32, and each apparatus 60 can be disposed on the flowline 12 during the deployment of the flowline 12. For example, if the flowline 12 is assembled from a plurality of insulated segments 20, the apparatuses 60 can be attached to the flowline 12 at the joints 32, e.g., before the field joint material 50 is applied. Thus, as illustrated in FIG. 3, the apparatus 60 can be disposed within the field joint material 50 so that the field joint material 50 at least partially surrounds the apparatus 60 and, in some cases, the apparatus 60 is disposed between a layer of the field joint material 50 and the underlying steel pipe 40.

The apparatuses 60 can be provided at various locations along the flowline 12, e.g., at some or all of the field joints 32 or at any other location along the flowline as required by the functional and installation requirements engineered for each specific flowline (see FIG. 5). Each apparatus 60 can be configured to monitor the flowline 12 at the position of the apparatus 60, e.g., at the respective joints 32 where the apparatus 60 is located, and thereby provide an output or communication that is indicative of the flowline 12. Thus, a condition or characteristic of the flowline 12, and throughout the length of the flowline 12, can be determined by receiving signals from the various monitoring apparatus 60 along the length of the flowline 12. In some cases, the apparatuses 60 can be placed at select locations along the flowline 12 where the flowline 12 is believed to be more likely to experience bending, buckling, stress, strain, temperature variations, or other conditions. Each monitoring apparatus 60 can also include one or more electric generation devices configured for generating power that can be used for monitoring the flowline 12 and providing an output or communication representative of the flowline 12, e.g., so that the apparatus 60 is not dependent on an energy supply that must be entirely pre-stored in the apparatus 60 before deployment.

FIG. 3 is a sectional view illustrating one of the monitoring apparatuses 60 attached to a flowline 12 through which a hot, mixed-phase produced fluid 82 is flowing. As illustrated, the apparatus 60 includes a sensor 62 for monitoring a characteristic of the flowline 12. For example, the sensor 62 can include a strain gauge for detecting strain in the flowline 12; a thermocouple, resistance temperature detector, or other device for detecting the temperature or temperature change of the flowline 12; a location or motion detection device for detecting movement or position of the flowline 12; and/or other devices for monitoring other characteristics of the flowline 12. The apparatus 60 generally can be attached to the flowline 12 by mechanical connections, adhesives, or the like. For example, a thermal epoxy resin can be used to connect the apparatus 60 and, in particular, to achieve a sufficient bond between the sensor 62 and the steel pipe 40.

A sensor 62 on critical moving sections of the flowline can be auto-calibrated by leveraging a nearby sensor 62 located on reference or static sections of the flowline. In another embodiment the sensors can be calibrated by the post-lay survey and the resultant position relayed to each apparatus from the topside module. Specifically, an underwater vehicle can be used to obtain the information on the starting point of the pipeline when it was originally installed. This position is then used for calibration and the relative movement will be monitored from this known starting point.

In one embodiment, the sensor 62 may be equipped with a device to communicate the monitored characteristic. The sensor 62 can be configured to provide a light output that is indicative of the temperature. For example, the sensor 62 can include an electromagnetic radiation emission device 64, such as a light emitting diode or other light emitter. The radiation emission device 64 can be adapted to provide a radiation output that varies according to the monitored condition of the flowline 12. For example, if the radiation emission device 64 is a light emitting diode, the diode can be configured to pulse at a frequency that indicates the condition of the flowline 12, shine with an intensity that indicates the condition of the flowline 12, change color to indicate the condition of the flowline 12, emit a coded pattern that indicates the condition of the flowline 12, or otherwise change its output to indicate the condition of the flowline 12. In some cases, the radiation emission device 64 can vary in numerous (or limitless) different variations, e.g., at any frequency, intensity, or color in a given range. Alternatively, the radiation emission device 64 can be configured to provide a limited number of variations in output to indicate certain discrete conditions of the flowline 12. For example, the emission device 64 can be configured to emit a first color if the flowline 12 is operating at a first condition (such as a normal condition), and a second color, or no color, if the flowline 12 is operating at a second condition (such as an abnormal condition).

The sensor 62 can be electrically powered by one or more electric generation devices, such as a thermoelectric device 66 and/or a solar cell 68, as illustrated in FIG. 3. The thermoelectric device 66 can operate according to the Peltier-Seebeck effect to generate electricity from a thermal potential, such as a thermal potential that may exist between the fluid in the flowline 12 and the seawater 70 that surrounds the flowline 12. A first side 72 of the thermoelectric device 66 can be directed radially inward toward the outside surface 44 of the steel pipe 40, and the second side 74 of the thermoelectric device 66 can be directed radially outward from the pipe 40 toward the seawater 70 that surrounds the flowline 12 when disposed subsea. When a temperature differential exists between the outside surface 44 of the pipe 40 and the seawater 70, the thermoelectric device 66 can generate electricity, which can be used to power the sensor 62.

The solar cell 68 can be configured to receive light and generate electricity from the solar energy. The solar cell 68 can be directed outward from the steel pipe 40 and configured to receive sunlight or other light that would otherwise impinge on the flowline 12. The solar cell 68 can be used instead of, or in combination with, the thermoelectric device 66. In either case, a battery 80 or other energy storage device can also be provided for storing energy from the electric generation device(s) 66, 68 so that the energy can be used at a time when sufficient generation of electricity may not be possible. For example, before the apparatus 60 is deployed subsea, the solar cell 68 may be exposed to sunlight, e.g., while the pipe segments 20 are stored or assembled, and the solar cell 68 can convert the sunlight to charge the battery 80 before deployment of the apparatus 60. In addition, or alternative, to charging a battery, the solar cell 68 can be used to power the sensor 62 prior to deployment and operation of the flowline 12, even though hot fluid is not passing through the flowline 12 and the thermoelectric device 66 is typically unable to power the sensor 62. For example, the solar cell 68 can be used to power the sensor 62 during the process of installing the flowline 12 to determine stresses, strains, or other characteristics of the flowline 12 before its final deployment. After deployment of the flowline 12 to its subsea location, the solar cell 68 may not receive sufficient light to power the sensor 62. At that time, the thermoelectric device 66 may generate sufficient energy to power the sensor 62, e.g., if the flowline 12 is being used to convey hot fluid 82. Energy from the thermoelectric device 66 may also be stored in the battery 80. If the thermoelectric device 66 is not able to generate sufficient energy, e.g., because hot fluid 82 has not entered the flowline 12 yet or the fluid in the flowline 12 has been evacuated or cooled during a period of non-use of the flowline 12, the battery 80 can be used to power the apparatus 60.

The output of the electric generation devices 66, 68 can be controlled by a controller 84. The controller 84 can communicate with the components of the apparatus 60 and control the operation of the apparatus 60 and/or each component of the apparatus 60. For example, the controller 84 can be configured to operate the apparatus 60 during some periods and not during others, such as according to a predetermined schedule or according to parameters of the environment of the apparatus 60. In some cases, the controller 84 can also process the data collected by the sensor 62.

Information detected by the sensor 62 can be stored in the apparatus 60, communicated from the apparatus 60 in real time, and/or communicated from the apparatus 60 in a delayed manner. More particularly, the sensor 62 can include a memory 86 that is configured to receive a signal from the sensor 62 and store some or all of the information from the sensor 62. For example, the memory 86 can store a log of information indicative of the output of the sensor 62 at regular time intervals. Alternatively, the memory 86 can be configured to store only certain information or information occurring at certain times, e.g., data values that are above or below predetermined thresholds that might indicate that the apparatus 60 is operating outside of a certain mode of operation, such as a high strain level or an extreme change in strain level that could indicate excess stress, damage, movement, or other changes in the flowline 12. The radiation emission device 64 can provide an output signal that generally is indicative of the present detection by the sensor 62, or the radiation emission device 64 can provide an output signal that is representative of data that was previously stored in the memory 86.

The apparatus 60 can include a transmitter 88 and/or receiver 90, which can be separate or combined devices. The transmitter 88 can be configured to transmit information from the apparatus 60 to another apparatus 60 and/or another receiver. In some cases, the transmitter 88 of a first apparatus 60' on the flowline 12 can be configured to communicate information to a second, successive apparatus 60" along the flowline 12. The second apparatus 60" can then communicate information from the first and second apparatuses 60', 60" to a third, successive apparatus 60'" along the flowline 12, and the communication can continue along the flowline 12 so that information from all of the apparatuses 60 is passed successively along the flowline 12. Such apparatus-to-apparatus communication can be performed via a wire, other media that extends between the apparatuses 60, or through the pipe 40 itself, or the apparatuses 60 can be configured to communicate wirelessly. Each apparatus 60 can also be configured to communicate with more than one of the successive apparatuses 60 so that communication along the flowline 12 is not prevented by the failure of one apparatus 60. For example, the first apparatus 60' can communicate directly to the second and third apparatuses 60", 60"', the second apparatus 60" can communicate directly with the third and fourth apparatuses 60"', 60"", and so on.

The system 10 can include a receiver that is configured to receive the signals from the various apparatuses 60, either directly from each apparatus 60 or via one or more other apparatuses 60 as described above. The receiver can be located subsea or above the seasurface 34. For example, as shown in FIG. 2A, a receiver 92a can be located on the PLET 24, and the receiver 92a can be configured to communicate via an umbilical or other cable 93 with a remote receiver device 92b at a topside location, e.g., via a flying lead connection to the umbilical 93 and/or via a subsea distribution unit or the like. The receiver 92a on the PLET 24 can also detect and record the displacement and/or force loading of the flowline 12, and this information can be stored in the receiver 92a and/or communicated with the topside receiver device 92b. In some cases, an underwater vehicle, as described below in connection with FIG. 4, can retrieve information from the receiver 92a on the PLET 24, i.e., so that the vehicle can obtain from one location various data from the apparatuses 60 and/or information measured at the PLET 24.

The solar cell 68 can receive light for powering the apparatus 60 and/or recharging the battery 80 even while the apparatus 60 is disposed subsea. For example, a light source can be passed along the flowline 12 so that the light source successively shines light on the apparatuses 60 along the length of the flowline 12, thereby providing energy for the apparatus 60. In particular, as shown in FIG. 4, the light source 94 can be carried by an underwater vehicle 96, such as an ROV or an (AUV). The underwater vehicle 96 can travel along the length of the flowline 12 and can include cameras or other equipment for visually inspecting the flowline 12. The light source 94 carried by the underwater vehicle 96 can provide sufficient light to illuminate the flowline 12 for the visual inspection. The light source 94 can also provide sufficient light to the solar cell 68 to temporarily power the apparatus 60, e.g., so that the apparatus 60 can provide a wirelessly communicated output signal to the underwater vehicle 96.

In another embodiment, the underwater vehicle 96 can be passed along the flowline 12 to successively receive communication and thereby determine the characteristic monitored by each of the sensors 62. The underwater vehicle 96 includes a receiver 98 that receives the output signal from the apparatus 60, as indicated by reference numeral 100. For example, in one embodiment where the sensor 62 includes a radiation emission device 64, if the radiation emission device 64 is configured to provide a light output, the receiver 98 can be a light detector that measures the intensity, frequency, or other characteristic of the light output. The underwater vehicle 96 can retransmit the information from the apparatus 60 to another, remote receiver, such as the receiver 92, and/or the underwater vehicle 96 can store the information from each apparatus 60 so that the information can be downloaded from the underwater vehicle 96 after the vehicle 96 completes its inspection of the flowline 12. In another embodiment, the apparatus 60 is equipped with an acoustic device to communication the monitored characteristic.

The apparatuses 60 can be provided at various locations along the flowline 12, e.g., at some or all of the field joints 32 or at any other location along the flowline as required by the functional and installation requirements engineered for each specific flowline. As shown in FIG. 5, in one embodiment the apparatus 60 can be provided at any location along the flowline 12.

The apparatus 60 may be equipped with a device separate from the sensor 62 to communicate the monitored characteristic. For example, as shown in FIG. 6, the apparatus 60 may be equipped with an acoustic device 63 to provide an acoustic output that is indicative of the characteristic. The acoustic device 63 could be both wireless and provide real-time information of the monitored characteristic. The apparatus 60 could also transmit via non-optical, wireless electromagnetic links. The acoustic device 63 could include an acoustic modem to provide real-time communication. The communication links can be made to subsea hardware, topside hardware, or a remote buoy.

With the acoustic embodiment, communication can be two-way. For example, a topside operator can reconfigure parameters after installation of each apparatus to fit their unique application. The frequency of data transmission is one example of a configurable parameter. In another embodiment, a topside operator can configure a subset of apparatuses to trigger a data transfer when the apparatus detects a threshold of temperature change or displacement. This can be used in fatigue sensitive areas of the flowline. In another embodiment, a topside operator can target a specific apparatus to get a status update outside of the normal transmission frequency. With the acoustic communication method, a topside operator has the ability to obtain information from a specific device or from a group of devices because each device has a specific signature. When utilizing the RF or LED communication methods, an underwater vehicle could travel to a specific device to gather information from that specific device.

With the acoustic communication embodiment, different methods for data transmission may be used. For example, as shown in FIGS. 7A, 7B, and 7C, data could be sent successively from acoustic device 63 to acoustic device 63 (individually indicated by reference numerals 63', 63", 63''', 63''''). As shown in FIGS. 7A and 7B, the data (A, B, C, D) moves successively from acoustic device 63 to acoustic device 63 (individually indicated by reference numerals 63', 63", 63''', 63''''). Each apparatus will simultaneously record and transmit data. The data will be received from a previous apparatus. Once the receiving apparatus is confident the data integrity was not compromised, it will then transmit to the next device. This process of device-to-device transfer will repeat itself until all data is transmitted topside. As shown in FIG. 7C, during data transmission, an acoustic device may be skipped if that device fails.

With the acoustic communication embodiment, communication can occur through different mediums. The apparatus can be exposed to water, or buried naturally in the ocean bed. The communication can be directed through the pipeline insulation or transmitted through the sea bottom mud. In some instances, as shown in FIG. 8, a repeater 140 can be placed near a buried flowline in order to transmit the data. For example, the repeater 140 could be deployed by an underwater vehicle 141.

The apparatus can be attached to the flowline during assembly and deployment of the flowline or the apparatus can be attached to an existing flowline. As shown in FIGS. 9A and 9B, an underwater vehicle 150 can be used to install the apparatus 60 on an existing flowline 12. The apparatus 60 can installed onto the existing flowline 12. In one embodiment, the apparatus 60 is installed onto the existing flowline 12 by clamping.

In another embodiment, a resident AUV may be used to collect information from the system. As shown in FIG. 10, a resident AUV 110 in the field may perform frequent fly-bys to collect data from the apparatuses 60 along the flowline 12. Upon harvesting all the data from the apparatuses 60, the AUV 110 returns back to the docking station 112 annexed to an umbilical termination assembly (UTA) 111 where the AUV 110 stabs a connector to transfer the data through the umbilical 113 to the platform 114.

In another embodiment, a pipeline internal moving device may be used to receive information from the system. As shown in FIG. 11, a pipeline internal moving device 120 can be equipped with receivers to receive the communication from the sensors 62 of the apparatus 60 during the pigging operation of the flowline 12. The pipeline internal moving device 120 may be a pig, a smart pig, an inline inspection tools, or another similar device. In one embodiment, a pig can be launched from a platform at one end of a flowline and received from the second end of the flowline on the platform. Once the pig is back on the platform, the data can be downloaded via a wireless or wired connection to a device or computer system on the platform.

In another embodiment, a plurality of sensors can be placed in a stream in the flowline. As shown in FIG. 12, the plurality of sensors 130 can be launched through one end of the flowline 12 to receive and collect data from the apparatus 60 mounted on the subsea flow device. The plurality of sensors 130 in the stream will then be collected at the second end of the flowline where the data is downloaded to a wireless or wired connection to a device or computer system. To be deployed, the plurality of sensors 130 can be injected into the flow stream through the chemical injection line of the umbilical and be retrieved when the plurality of sensors 130 reach the separator at the platform. The plurality of sensors 130 can be read at the separator. The plurality of sensors 130 can then be cleaned and reset as needed and reused. The plurality of sensors 130 can be miniaturized encapsulated sensors or miniaturized components with material properties that change to reflect the pertinent information received from the sensors 62. The plurality of sensors 130 can be designed to selectively acquire different information from sensors 62 along the flowline 12. In one embodiment, if one member of the plurality of sensors 130 does not have enough room for all the information, a subsequent another member of the plurality of sensors 130 can retrieve the additional/excess information. The large amount of information can be divided among the plurality of sensors 130.

It is appreciated that the apparatus 60 can generally be relatively simple, small, and inexpensive. Further, the apparatuses 60 can be integrated to form the system 10, which can be customized to provide any desired type and amount of monitoring and communication, and which can be adapted according to the changing needs of a particular flowline 12 or other monitored device.

Many modifications and other embodiments of the inventions set forth herein will come to mind to one skilled in the art to which these inventions pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for monitoring a subsea flowline, the system comprising a plurality of apparatuses disposed respectively at successive joints along a length of the subsea flowline wherein each of the plurality of apparatuses comprises:
    a thermoelectric device adapted to generate electric power from a thermal potential between the subsea flowline and surrounding seawater;
    a sensor powered by the thermoelectric device and adapted to monitor at least one of a movement and a position of the subsea flowline and provide a radiation output representative of data that is indicative of at least one of the movement and the position of the subsea flowline; and
    a pipeline internal moving device for moving within the subsea flowline equipped with a plurality of receivers to receive communication of the radiation output from the sensors of the plurality of apparatuses.

2. The system according to claim 1, wherein the sensor providing the radiation output comprises an acoustic device providing acoustic output that is indicative of at least one of the movement and the position of the subsea flowline.

3. The system according to claim 1 wherein the pipeline internal moving device is selected from the group consisting of a pig, a smart pig and an inline inspection tool.

4. A method for monitoring a subsea flowline having a plurality of successive pipe segments joined at joints, the method comprising:
generating electric power from a thermal potential between the subsea flowline and surrounding seawater;
using the electric power to operate a sensor and thereby monitoring a characteristic of the subsea flowline;
providing a radiation output from the sensor that is indicative of the characteristic monitored by the sensor;
mounting an apparatus to the subsea flowline at one of the joints, the apparatus being configured to perform the steps of generating the electric power, using the electric power, and providing the radiation output; wherein the steps of generating the electric power, using the electric power, and providing the radiation output are performed at a plurality of locations at successive positions along the length of the subsea flowline; and
launching a pipeline internal moving device into the subsea flowline; and passing the pipeline internal moving device through the subsea flowline along the subsea flowline and successively detecting the radiation output from the sensor with the pipeline internal moving device to thereby determine the characteristic monitored by each of the sensors.

5. The method according to claim 4, wherein the sensor providing the radiation output comprises an acoustic device providing acoustic output that is indicative of at least one of the movement and the position of the subsea flowline.

6. The method according to claim 4, further comprising receiving the pipeline internal moving device from the subsea flowline onto a platform; and downloading the radiation output via a wireless or wired connection to a device or computer system on the platform.

7. The method according to claim 4, further comprising storing information from the sensor in a memory mounted on the subsea flowline, the information being indicative of the characteristic over a period of time, and outputting the information for the period of time from the memory.

* * * * *